Feb. 20, 1923.
D. L. STULL.
ICE CREAM CONE BAKING MACHINE.
FILED APR. 4, 1919.
1,446,136.
6 SHEETS—SHEET 1.
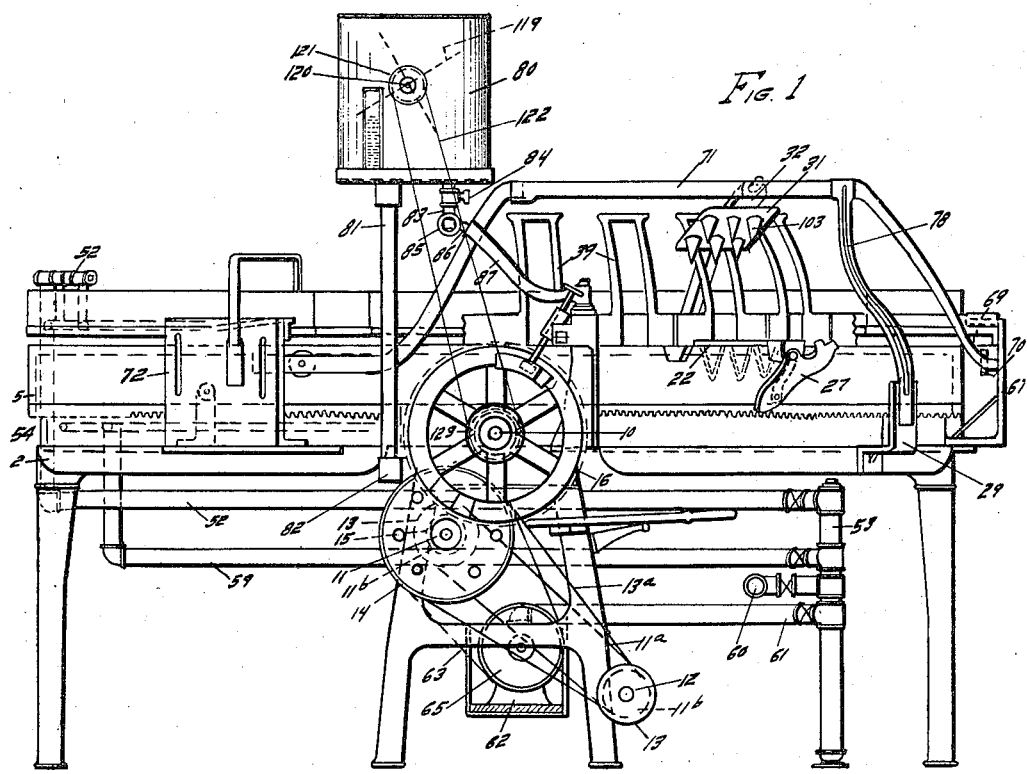
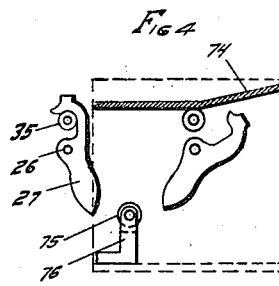
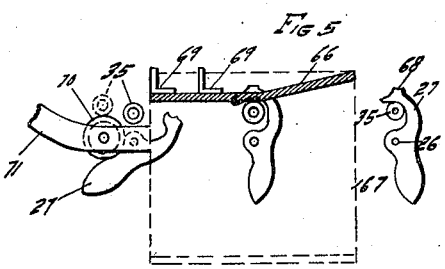
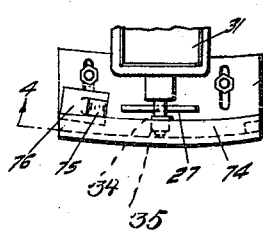
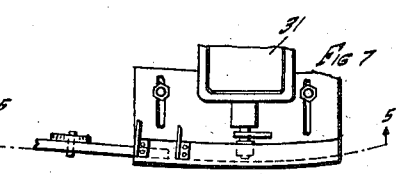
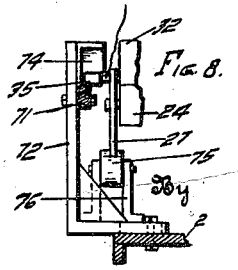
Inventor
D. L. Stull
Witness
J. W. Clancy
By
Attorney Feb. 20, 1923.  
D. L. STULL.  
ICE CREAM CONE BAKING MACHINE.  
FILED APR. 4, 1919.
1,446,136.
6 SHEETS—SHEET 2.
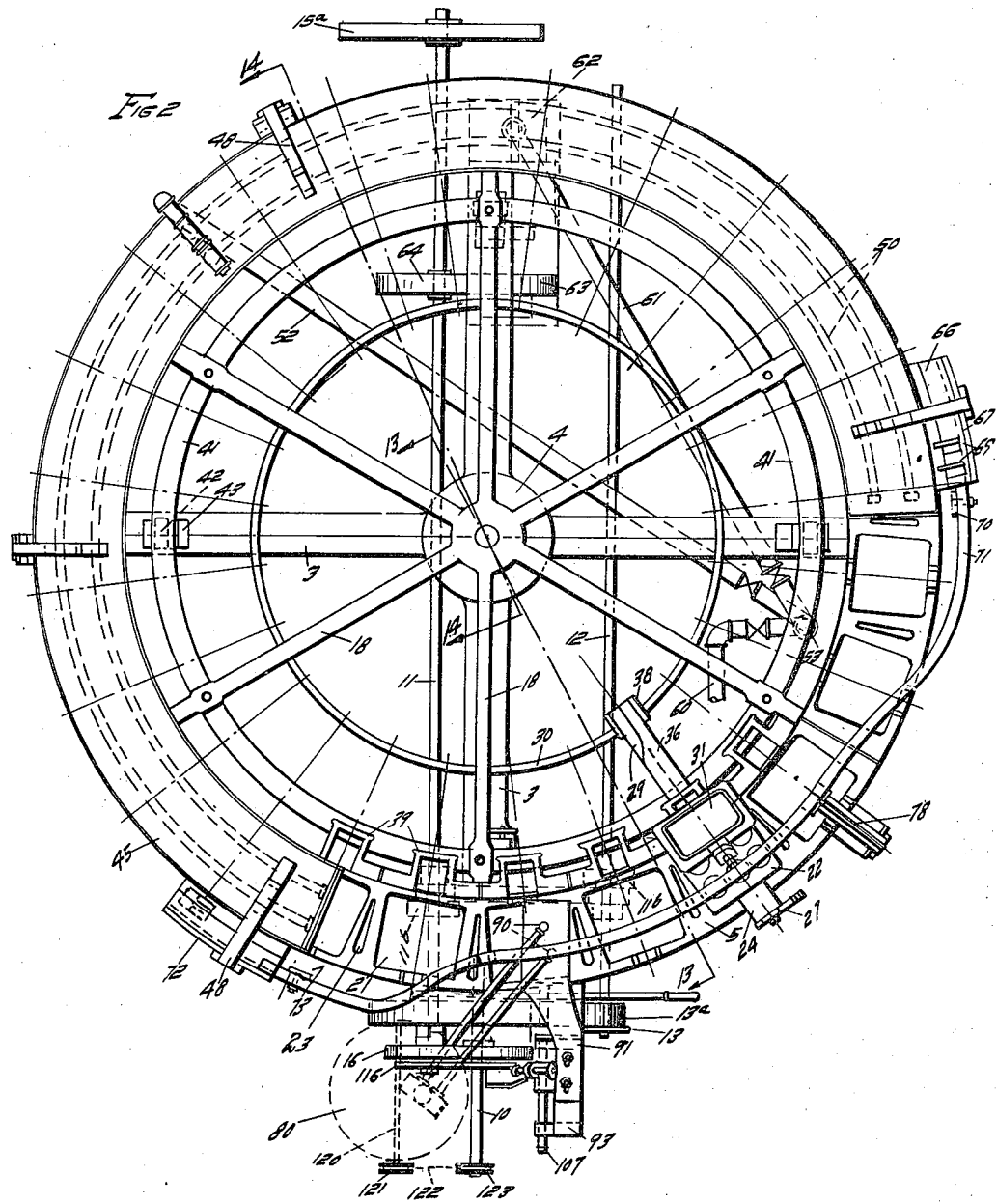
Witness J.W. Clancy
D. L. Stull Inventor
By *[signature]*  
Attorney

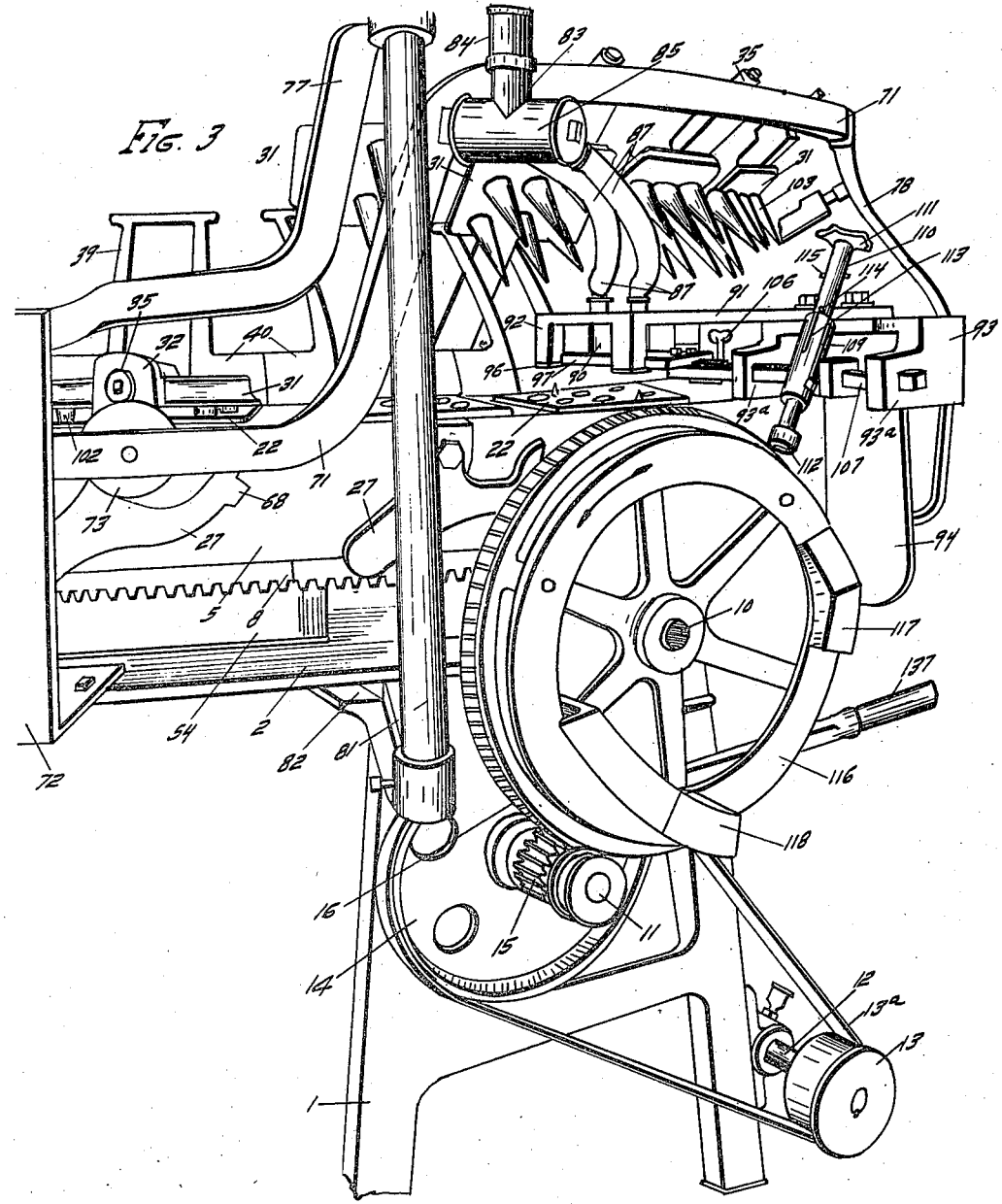

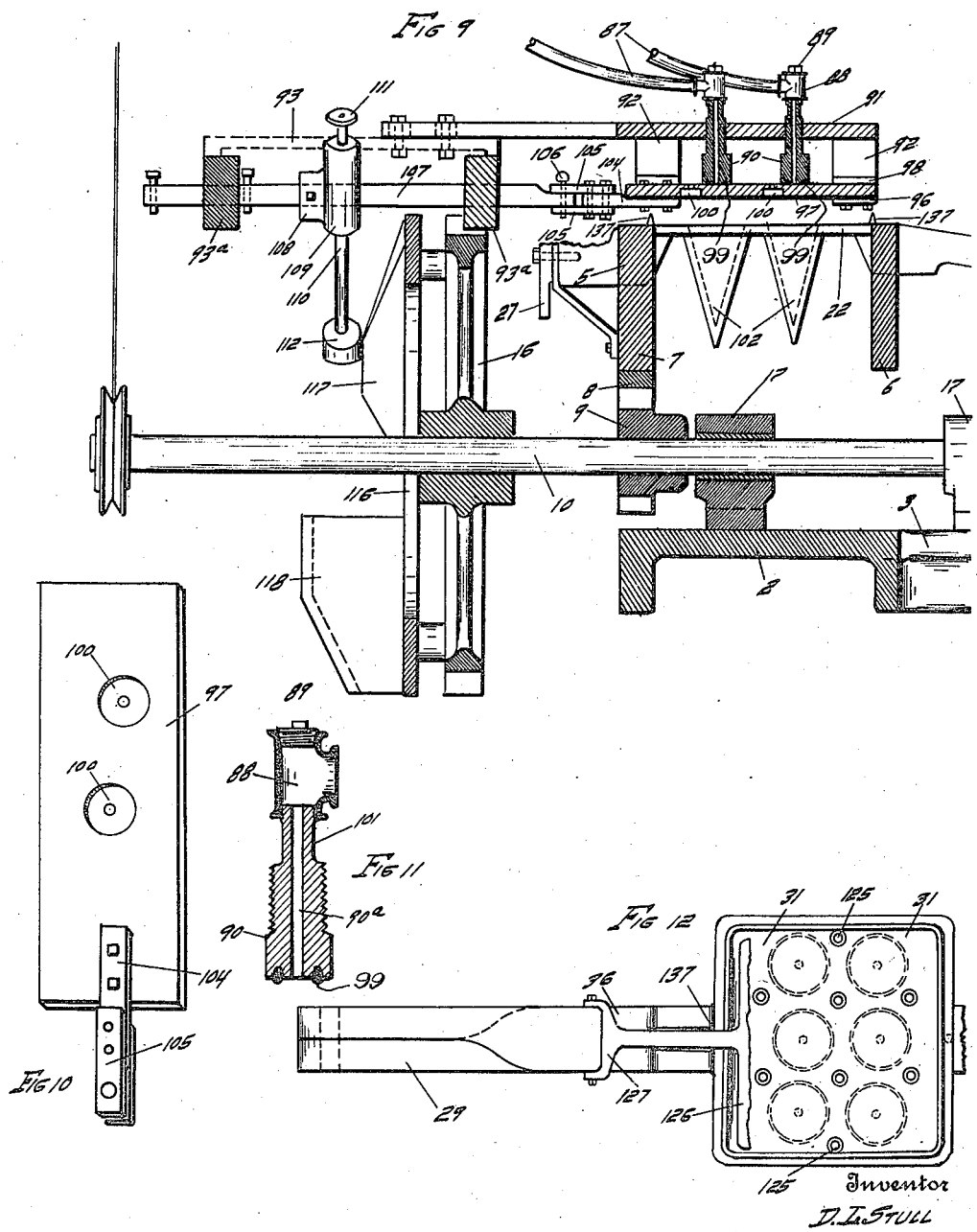

Feb. 20, 1923.
D. L. STULL.
ICE CREAM CONE BAKING MACHINE.
FILED APR. 4, 1919.
1,446,136.
6 SHEETS—SHEET 5.
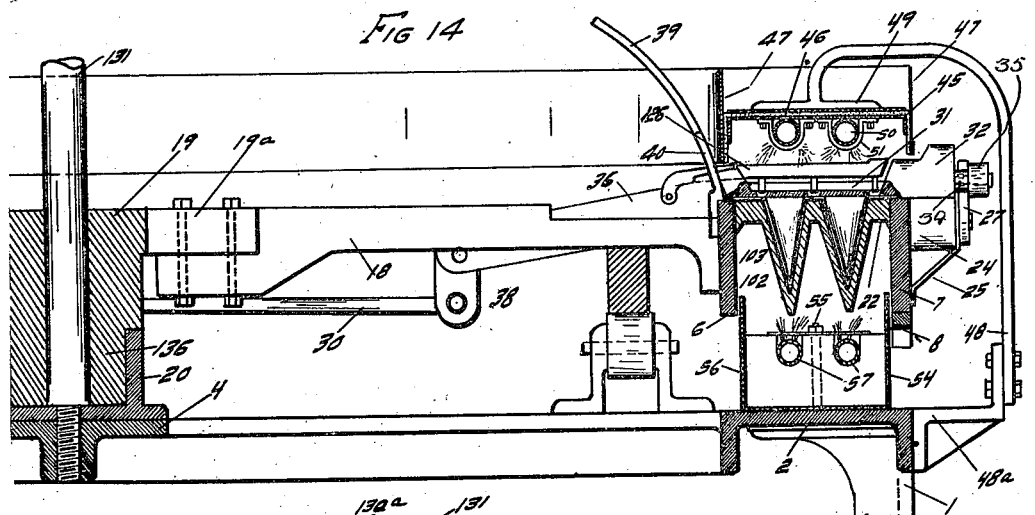
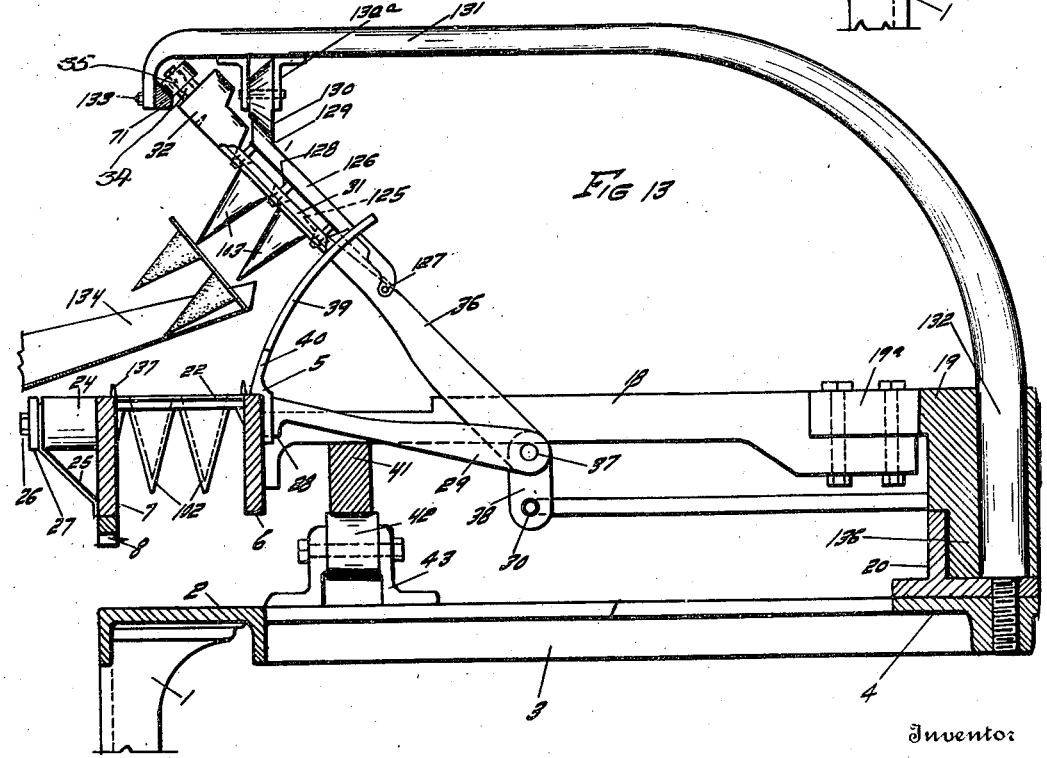

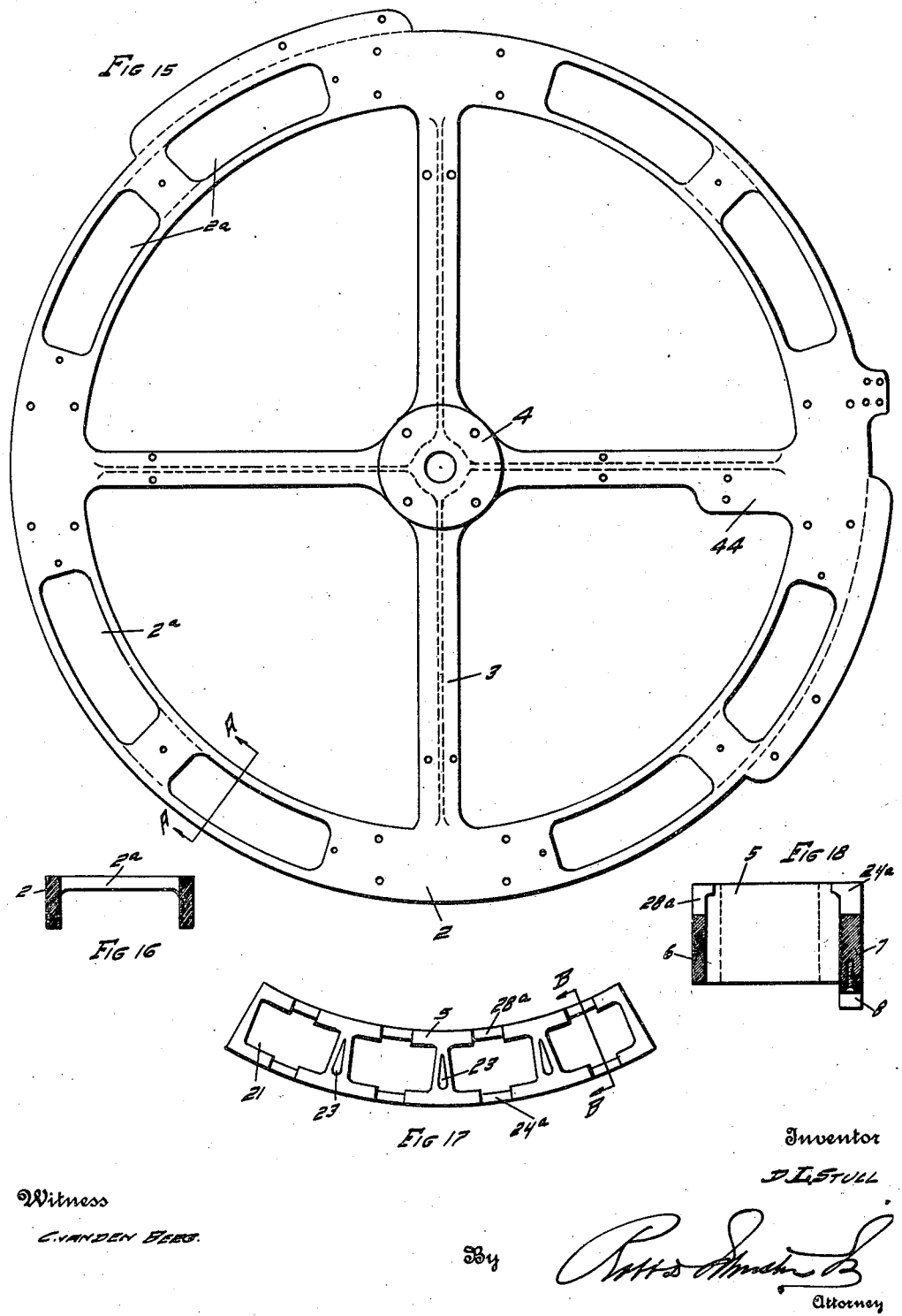

Patented Feb. 20, 1923.

1,446,136

UNITED STATES PATENT OFFICE.

DAVID L. STULL, OF BIRMINGHAM, ALABAMA, ASSIGNOR TO JOSEPH B. POOL, OF BIRMINGHAM, ALABAMA.

ICE-CREAM-CONE-BAKING MACHINE.

Application filed April 4, 1919. Serial No. 287,543.

*To all whom it may concern:*

Be it known that I, DAVID L. STULL, a citizen of the United States of America, residing at Birmingham, in the county of Jefferson and State of Alabama, have invented certain new and useful Improvements in Ice-Cream-Cone-Baking Machines, of which the following is a specification.

This invention relates to an improvement in baking machines suitable for baking ice-cream cones and like pastry.

More particularly my invention relates to improvements in the continuous baking machine for wafers and cones forming the subject matter of Letters Patent No. 967,147, issued to Roger L. Trewick and owned by me and which comprises a continuously traveling carrier on which the baking irons are mounted so as to travel through an oven having gas burners above and below the carrier in which the baking process is carried out. After the baking irons pass out of the oven the mold sections are mechanically separated for the removal of the baked pastry and for refilling the molds with batter after which they are automatically closed and again passed through the oven.

One object of my invention is to provide a novel means for obtaining a practical fastening of the baking iron sections during the baking process to the end that may be clamped together and unclamped easily and without appreciable frictional wear on the clamping devices, and to this end I provide stationary cams associated with latch tripping devices and adapted to compress the baking iron sections as they travel before applying or releasing their respective clamps. By this arrangement the clamps are practically relieved of frictional wear and will possess long life.

A further object of my invention is to provide an effective batter feeding apparatus which will be free from the objection of having the batter clog therein by reason of exposure to the heat, which trouble is characteristic of the present types of batter feeding apparatus for continuous baking machines. This object is accomplished by the provision of small feeder tubes for each batter discharge orifice, each tube having a carrying capacity so small that it will be washed clean by each succeeding charge of batter, thus avoiding any tendency of the batter to stand in the tube for any length of time exposed to the heat.

A further object of my invention is to perfect the batter deposit appliance so as to avoid the objection of an after drip. This I accomplish by conducting the batter tubes to a point closely associated with the surface of the lower baking iron to be charged and at the end of each batter tube is provided a rubber or like discharge nozzle which is in contact with a valve plate controlled by the movable carrier and shifted to bring its ports into register with the tube ends at the proper time. This ported plate being thin and acting to close the end of the batter tube will operate without an after drip.

A further object of my invention relates to a novel means for mounting and guiding the upper or male section of the baking irons on a rotary carrier so as to cause them to travel about a long radius and between upright guides which center and steady the upper sections during their vertical movements relative to the lower or fixed baking iron sections.

A further object of my invention is to provide a continuous cone baking machine with means for exhausting the steam generated in the hot baking irons or mold just after the deposit of the batter therein and before the irons or molds are finally locked for the baking operation, my experience being that the deposit of the batter in the hot irons especially when designed to bake cones, brings about the prompt generation of steam, which, if exhausted from the mold, will reduce to a minimum the number of cones made defective by blowouts.

A further object of my invention is to adapt the mold for baking ice-cream cones to cause the baked cones to adhere to the upper or male mold and also to provide means for stripping the cones from this mold automatically instead of by hand as is the present practice with solid mold cone baking machines where the tendency of the cone is to stick to the lower or female baking iron. According to my invention the top or male mold is provided with pockets having plungers movable therein and into which the batter is pressed when the mold is closed and baked therein so as to take firm hold on this top mold and to be lifted thereby from the female mold and held thereon until the plunger is automatically depressed to strip the cone from the top mold, which action takes place in the raised position of the latter.

A further object of my invention is to provide a batter container with means for automatically agitating the batter so as to preserve the uniformity of its constituency as it is fed to the baking irons or molds, this being an arrangement which is particularly desirable where oil, for preventing the cones sticking to the molds, is incorporated in the batter, as it has a tendency to cause the batter to become lumpy if allowed to stand.

My invention comprises the novel details of construction and arrangements of parts which are hereinafter more particularly described only in their preferred embodiments, reference being had to the accompanying drawings which form a part of this specification, and in which:—

Fig. 1 is a front elevation of my machine in which I have shown only one complete breaking iron and its respective clamp means as all others are duplicates and would unnecessarily confuse the figure.

Fig. 2 is a plan view of Fig. 1 and from this view also the multiplicity of complete baking irons is omitted, their location being indicated by center lines.

Fig. 3 is an enlarged perspective view showing the driving mechanism, the preferred arrangement of the lifting cams for the top baking irons and the batter deposit mechanism.

Figs. 4 and 5 are detail sectional views respectively taken on lines 4—4 and 5—5 of Figs. 6 and 7, and illustrating the cams and the means for applying and releasing the baking iron clamps.

Figs. 6 and 7 are plan views respectively of Figs. 4 and 5.

Fig. 8 is an end view of Fig. 4, looking to the left.

Fig. 9 is a detail sectional view taken through the batter deposit mechanism.

Fig. 10 is a perspective view of the batter valve.

Fig. 11 is a sectional view of a batter nozzle.

Fig. 12 is a plan view of a baking iron with the automatic cone plunger omitted.

Fig. 13 is a vertical sectional view taken through the apparatus on the line 13—13 of Fig. 2, and showing a modification of my invention in which the baking irons are equipped with means for causing the cones to stick to the upper members and plunger means to detach the baked cones.

Fig. 14 is a sectional view taken through the oven on the line 14—14 of Fig. 1 and showing the ovens in section.

Fig. 15 is a plan view of the bed plate.

Fig. 16 is a cross sectional view of the bed plate taken on the line A—A of Fig. 15.

Fig. 17 is a plan view of one of the segmental supports for the baking irons; and Fig. 18 is a sectional view taken on the line B—B of Fig. 17.

Similar reference numerals refer to similar parts throughout the drawings.

In the preferred embodiment of my invention illustrated in the drawings, the apparatus is adapted for the continuous movement of a series of baking irons which are arranged upon a rotating carrier, but it will be understood that other well known types of moving carriers or conveyers for the irons may be employed within the scope of my invention. As constructed for a rotary carrier, the apparatus is supported upon four equi-distantly spaced legs or cast metal frames 1 which at their upper ends are made fast to the annular channelled bed plate 2 (see Fig. 15), which is connected by radial arms 3 with a center hub plate 4. Above and concentric with the bed plate 2 is an annular rotatable carrier 5 preferably in the form of a sectional ring having vertical circumferential flanges 6 and 7, depending respectively from its inner and outer periphery edges, the flange 7 of each ring section (see Fig. 17) having attached to its bottom edge a segment of an annular toothed ring or gear 8 which meshes with a driving gear 9 on a shaft 10, which is preferably driven by the mechanism illustrated more clearly in Figs. 1 and 3 and which comprises a main power shaft 11 mounted so that its ends overhang from suitable bearings on a diametrically opposite pair of legs 1 and driven by any suitable means such as a pulley 15$^a$ (Fig. 2). The drive from this shaft to a countershaft 12 is by means of a belt 11$^a$ working over reversely tapering cone pulleys 11$^b$ on the shafts 11 and 12, this arrangement being provided for obtaining a variable speed drive. The drive from the shaft 12 is by means of a pulley 13 and a belt 13$^a$ to a large clutch pulley 14 which turns loosely on the shaft 11 and is adapted to have its clutch elements interlock with equivalent clutch elements on a small driving pinion 15 which also turns freely on the shaft 11 and is adapted to mesh with a large gear wheel 16 fast on the shaft 10 on which the driving gear 9 is also fast. The shaft 10 is mounted in suitable bearings 17 attached to the bed plate 2 and to a radial web 3 in alignment with the shaft. The carrier is supported by a plurality of radial arms 18, each of which has at its outer end a downturned flange which is bolted to the carrier flange 6 and at its inner end is shaped to fit against and under a short lug 19$^a$ on a hub 19 which is mounted to turn in the oil box 20 made fast to the hub 4 of the bed plate. I have illustrated the bed plate as a marginal ring with openings 2ª therein and provided with four wide and strong integral supporting webs 3 while the annular carrier 5 is supported by six lighter equidistantly spaced arms 18, but any suitable means may be employed for the proper support of these parts, that shown being designed particularly with a view to obtaining lightness and a comparatively inexpensive construction.

The annular carrier 5 is preferably cast in segmental sections (see Fig. 17) suitably connected at their meeting ends, and its upper or top horizontal surface is provided with spaced openings 21 each suited for the reception of the lower or female baking iron section 22 which fits down into its respective opening 21 and is provided with a marginal flange which rests on the top of the carrier and slopes from the baking surface proper of the iron down to the level of the carrier. These baking iron sections are closely associated in the carrier but are sufficiently spaced to leave room for the interposition between them of radial slots 23 which extend almost the radial width of the carrier ring between its flanges 6 and 7 and which may be formed as a continuous slot or in any other manner which will provide openings between the adjacent baking irons through which an equalization of heat above and below the irons will be obtained in the manner hereinafter described.

Each baking iron section 22 at the center of its outer edge is provided with a boss 24 rounded underneath and seated in a suitable slot 24ª in the top of the flange 7 and adapted to project approximately two and one-fourth inches beyond the flange 7. This boss is attached to the flange 7 by means of a strap 25 suitably bolted to the flange 7 at its lower end and its upper end having a hole for the reception of a cap screw 26 which also serves to pivotally mount a latch 27 on the outer end of the boss. The baking iron section 22 is provided at the middle of its inner edge with a boss 28 which is rounded underneath and seats in a slot 28ª in the top of the flange 6 and projects inwardly beyond the same and is there connected to or formed integral with a radial rod 29 which extends inwardly to a point above a loose or floating ring 30 which is concentric with the carrier and disposed between webs 3 of the bed plate 2 and the supporting arms 18 of the carrier.

The upper or male baking iron 31 conforms substantially to the baking iron 22 and at the center of its front edge it has cast integral therewith a boss 32 adapted to overlie the boss 24 and having a cap screw 33 screwed into its outer end beyond the boss 24 and adapted to rotatably support an inner antifriction roller 34 and a relatively larger outer roller 35, both rollers being free to turn independently on the bearing 33. The top baking iron section 31 at its inner end is attached to or cast integral with a radial arm 36 which extends inwardly for part of its length above the arm 29 for its respective female iron section and then is twisted and flattened so as to lie alongside the flattened inner end of the arm 28 and there both arms are provided with aligning openings to receive a horizontal hinge pin 37 which hingedly connects them together between the upper ends of a pair of links 38 which are freely and pivotally mounted on the ring 30. This serves as a floating connection to which the sections comprising the several baking irons are independently hinged and the connection is adapted to provide for the ready detachment and substitution of any baking iron or section thereof when such is required without disturbing the rest of the apparatus.

The arm 36 which supports each upper or male baking iron section 31 is disposed to pass through its respective upstanding slotted guide plate 39 attached at its base to the flange 6 of the carrier. One of these plates is provided for each baking iron and each plate is provided above the top surface of the carrier with lateral flanges 40 which abut to form an annular raised wall about two and one-half inches above the inner peripheral edge of the carrier ring 5. The object of this wall is to prevent the escape of heat between the inner edge of the carrier and the oven hood which will be later described.

In order to better support and steady the rotary carrier I provide a circular track 41 which is attached to the undersurfaces of the carrier supporting arm 18 and is concentric with the carrier and is supported on a series of rollers 42 (see Fig. 12) which are mounted in bearings 43 attached to the webs 3, the web 3 which supports the bearing 17 for the shaft 10 being provided with a lateral offset seat 44 (see Fig. 15) on which a roller bearing 43 is attached.

The apparatus for heating the baking irons comprises top and bottom ovens each of which have the shape of a segment of a ring extending approximately three-fourths of the circumference of the carrier. As seen in Figs. 1 and 14, the upper baking oven comprises an inverted channel-like casing 45 having its side and top walls lined with sheet asbestos 46 and having its side walls extended slightly above its top level to give it finished flanges 47. The bottom edges of this casing lie in the same plane and are spaced just high enough above the top baking irons 31, when in closed position, to clear the latter. The top oven is supported by a series of curved arms 48 attached at their bases to brackets 48ª bolted to the outer flange of the bed plate 2. The arms curve inwardly and then downwardly and are provided with flanges 49 which are connected to the top oven so as to support it rigidly in proper position. Within the oven I arrange a pair of curved burners 50 which are supported by pipe cleats 51 attached to the oven top. These top burner pipes receive their gas supply from the gas pipe 52 which leads from the gas supply pipe 53 and passes across under the bed frame 2 and then upwardly and over the top of the oven and there is provided a pair of branch connections leading downwardly through the top of the oven and connecting each to a burner 50. This connection is made preferably at the center of each pipe 50 so as to get a more uniform distribution.

The lower oven comprises a curved trough like casing 54 mounted on the bed plate 2 and attached thereto at intervals by bolts 55 passing down through brackets 56 which are grooved to receive the bottom burner pipes 57. The bolts preferably pass through top hold-down straps 58 which hold the burner pipes in the brackets. It will be noted that the vertical side walls of the trough extend substantially into the trough formed by the depending flanges 6 and 7 of the carrier and they are so disposed as to clear the latter flanges but to extend sufficiently above their lower edges to prevent any substantial loss of heat from the lower oven which lies under the top oven. The lower burners are supplied with gas by a pipe 59 leading from the supply pipe 53 and lying under the pipe 52. The pipe 59 is provided with an upturned branch leading through the bottom of the trough 54 and connecting with the burner pipes 57 at their centers. A pipe 60 leads from the gas main to and connects with the pipe 53 above the connection therewith with an air blast pipe 61 leading from a blower 62 shown in dotted lines in Fig. 1, which blower is driven by a belt 63 from a pulley 64 on the main shaft 11, this belt acting to drive the blower pulley 65 and rotate the latter to force a blast of air along with the gas supply to the several burners 50 and 51. The pipe 53 is substantially larger than the pipes 52 and 59 and in reality forms a mixing chamber for the air and gas before the latter is distributed through the pipes 52 and 59 to the burners.

During the travel of the baking iron through the oven the clamps 27 are in engagement with the rollers 34 and this holds the two baking iron sections tightly clamped together. As the baking iron emerges from the oven after the completion of the baking operation, the outer or larger roller 35 which projects beyond the oven walls will pass under a cam 66 carried by a bracket 67 attached to the bed plate 2. This is illustrated more clearly in Figs. 5 and 7 where it will be seen that the clamp 27 is provided with a top lug 68, which lug is disposed above the lower level of the cam 66 and in position to be engaged by a pair of trip plates 69 overhanging from the inner edge of the cam 66. These trip plates act to engage the lug 68 and disengage the clamp from the roller 34 after the wedge acting on the outer roller 35 has compressed the iron sections together sufficiently to loosen the engagement of the clamp and permit it to be easily disengaged. Immediately after the iron has passed the cam 66 the outer roller 35 of the top iron section engages what I term a breaking roller 70 which is journaled on a lifting cam 71 attached to the bracket 67 at one end and rising therefrom on a gradual slope to its upper level and thence descending on a reverse slope to and being attached to a cam bracket 72 at the other end of the oven. The rollers 35 in riding up this cam will lift the top iron sections 31 successively and will retain them in elevated position during the major portion of the time each baking iron is out of the oven. As the iron sections 31 follow down the cam 71 and again approach the oven they are permitted to assume normal closed position with the lower oven sections 22 for an appreciable interval of time before reaching the oven, this interval of time giving opportunity for the heated irons to generate steam from the batter that has been deposited therein and to permit the use of roller 73 to slightly raise the top iron and permit the escape of this generated steam before the roller 35 on the top iron section passes under the cam 74 on the cam bracket 72. The roller 73 is journaled on the cam 71 near bracket 72. The cam 74 by engaging roller 35 serves to compress the iron sections together and while thus held compressed, a roller 75 journaled in a bracket 76 engages the lower end of the clamp 27 and rocks the latter into clamped position while the roller 35 is still traveling under the horizontal portion of the cam 74. By this arrangement the cam holds the irons compressed while the clamp is being applied and thus the clamp will move easily and without substantial frictional wear in assuming its engaged position, which position it retains during the traverse of the oven and until it is engaged by the action of the trip plate 69, two of which are used to make certain that the clamp will be disengaged. The brackets 67 and 72 are adjustably attached to the bed plate 2. In order to insure the baking iron sections 31 following down the cam 71 a supplemental cam 77 may be provided (see Fig. 3) and this is attached at its lower end to the bracket 72. In order to brace the cam way 71 near its center I provide a bracket 78 which is connected thereto and has a base 79 attached to the outer flange of the bed plate 2.

The apparatus for depositing the batter in the mold or baking irons will now be described. This apparatus comprises a batter tank 80 supported rigidly by means of a shaft 81 mounted at its lower end in a bracket 82 attached to the front leg 1 of the machine. This shaft supports the batter tank substantially above the level of the carrier and from the bottom of the tank I lead a discharge pipe 83 having a cut off valve 84 therein and which opens into a large reservoir pipe section 85 from which lead two reduced nipples 86. A rubber hose or flexible pipe 87 is connected to each nipple 86 and at its lower end each hose is connected to its respective T-fitting 88 having a top clean out plug 89 and having a threaded connection at its lower end with a nozzle 90 which has a small feed passage 90ª leading therethrough and opening through its enlarged bottom end. These nozzles are screwed through a top plate 91 which is provided with side guide lugs 92 and at its outer end is adjustably bolted to a bracket 93 having a depending web 94 which is attached to a bracket 95 on the bed plate. Bottom supporting plates 96 are attached to the bottoms of the guide lugs 92 and serve to support a sliding valve plate 97 which is guided at the side by the lugs 92 and which is supported by the plates 96 in free sliding contact under the shoulders 98 on the guides 92. The flattened bottom ends of the feed nozzles 90 are preferably provided with ring washers 99 surrounding the batter discharge openings therein and engaging the top surface of the valve 97. The sliding valve plate 97 is provided with offset ports 100 enlarged at their lower ends and at their upper ends having substantially the diameter of the feed opening 90ª through the nozzles. Where the threaded shank of the nozzle is exposed above the plate 91 it is provided with a wrench grip 101 by means of which it may be adjusted towards or from the valve 97 so as to maintain by its washer 99 the proper non-leaking sliding contact therewith.

In the construction illustrated the valve 97 is provided with two ports arranged radially of the machine and disposed each in the line of travel of one of the two series of molds in the baking irons, which molds, as shown, are designed for the production of ice-cream cones and comprise a female mold member 102 carried by the baking iron section 22 and a male mold member 103 carried by the baking iron section 31. Taper dowel pins 137 on the irons 22 engage suitable holes in the section 31 and center them. In my preferred arrangement each baking iron is formed with six molds arranged in inner and outer series of three each, but it will be understood that any desired arrangement, or number or shape of the molds may be had to meet different conditions. The inner and outer series of molds are arranged in concentric circles, each series being arranged under its respective batter feeding nozzle 90. The sliding valve plate 97 stands normally in the position shown in Fig. 9 with the nozzles 90 closed or valved off at their discharge ends. The valve is opened automatically by the mechanism which will now be described.

At the outer end of the valve I bolt a short bar 104 (see Figs. 9 and 10) which in turn has bolted to it above and below strips 105 which are provided with aligning threaded openings to receive a thumb screw 106 which is adapted to screw through a threaded opening in the square slide bar 107 which is detachably coupled to the bar 104. This bar slides in aligning openings provided in webs 93ª on the casting bracket 93 and between these bearings I clamp to the bar a housing 108 having therein an inclined tubular guide 109 in which a rod 110 is slidably mounted, the rod being produced with a handle 111 at its upper end and with a roller 112 at its lower end below the housing. The housing is provided with a longitudinal slot 113 in which a cross pin 114 on the rod 110 works. When the pin 114 is in the slot 113 the rod 110 will drop to its lowered position, being arrested by the stop pin 115 but when raised and turned the pin 114 will engage the top of the housing 108 and hold the roller 112 in elevated position. When in elevated position the roller 112 will clear the cam ring 116 which is suitably bolted to the large gear wheel 16 and which is provided with a valve closing cam 117 and a valve opening cam 118, as will be more clearly seen in Fig. 3. The valve closing cam which travels counter-clockwise is provided at its front end with a bevelled surface which, when the rod 110 is lowered, will engage the roller 112 and force the slide bar 107 and the valve plate 97 to their outermost positions, as shown in Fig. 9, in which the ports 100 are out of register with the nozzle ports 90ª. The valve opening cam 118 is formed by a casting attached to the cam ring and provided at its top edge with an overhung cam surface which will first pass over the roller and will then engage and force the roller inwardly towards the machine, thereby moving the valve ports 100 into register with the nozzle ports 90ª and starting the deposit of batter. The relative position of the cams determines the length of time during which batter is deposited and they may be adjusted on the cam ring to meet the required conditions. The timing of the valve movements is co-ordinated with the movement of the carrier so that the valve will be held opened only while each baking iron is in predetermined positions in passing thereunder and moreover it will be opened at the correct time to start the deposit of batter as the first molds of each iron come thereunder and to shut off the deposit of batter as the last molds of each iron pass from under it. This co-ordination is obtained by the fact that both the cam ring 116 and the carrier 5 are driven from the same shaft 10, the main gear wheel 16 being adapted to have one complete rotation for each baking iron on the carrier. The size of the batter feeding duct or passage through the hose pipe 87 is considerably larger than the feed port 90ª through the nozzle, the latter being purposely restricted in diameter so that there will be a substantial flow of batter through each nozzle during each depositing operation and as a result the nozzle cleans itself with each deposit and no batter stands therein for any length of time exposed to the heat. It will also be noted that the only contact between the valve 97 and the batter feeding nozzles is at the packing rings 99 and by this arrangement I reduce to an extreme minimum the frictional resistance of the valve and produce a batter apparatus which will operate almost indefinitely without having to be cleaned. As the rings 99 wear the nozzles are screwed towards the valve in the manner already described, but when worn out new washers are inserted by unscrewing the nozzles without it being necessary to take down any parts.

To prevent the batter in the batter tank becoming lumpy and where oil is used to keep the latter thoroughly mixed with the batter, I provide an agitator 119 formed preferably of blades mounted on a transverse shaft 120 which passes diametrically through the tank and on its outer end is provided with a grooved pulley 121 which is driven by a belt 122 from a pulley 123 on the outer end of the shaft 10. By this arrangement the batter is continually and automatically agitated and the oil is kept thoroughly mixed.

To regulate the amount of batter deposited with each operation of the valve, the nozzle carrying plate 91 is provided with elongated slots 124 for the bolts which attach it to the casting 93 and by adjusting this plate outwardly or inwardly the nozzles are brought into register more or less fully with the valve ports 100 and in this manner a maximum deposit of batter will take place when the nozzles and ports come into full register and a reduced deposit will take place when they come only into partial register.

I have adapted my apparatus for the automatic discharge of the baked cones or the like by the following mechanism, which is best understood by reference to Figs. 12 and 13. Here the stop iron 31 is provided with a plurality of holes 125 drilled or otherwise formed therein and opening entirely therethrough. These holes are suitably distributed about and between the molds 103 so as to produce a substantially even distribution over the iron and each hole is preferably contracted at its bottom end. A plunger 126, pivotally connected to the arm 36 of the iron 31 by a pin 127, carries a punching pin 128 on each hole 125, and these pins are adapted to project through the holes and to engage the top surface of the bottom baking iron section 22. The weight of the plunger normally forces the pins through the holes 125 but when the iron sections are clamped together the pins are forced outwardly by engagement with the bottom iron 22 and by the pressure of the batter so as to assume the outer position shown in Fig. 14, which position is retained by the plunger during the baking operation. This will result in a certain part of the batter being baking in the openings 125 which will be sufficient to cause the set of cones baked in each iron to adhere to the upper or male iron 31 and be lifted therewith on the cam track 78. As the iron sections 32 travel over the cam 71 a wedge lug or boss 129 on the free end of each plunger 126 will be engaged by a roller 130 journaled in bearings 130ª on a rod 131 which at its inner end is passed down into a central opening 132 in the hub 19, which is provided with a reduced tubular bottom member 136 which fits down into and turns in the oil box 20. The rod 131 is passed down through a central opening in the hub 19 and its threaded shank 136 is screwed through the bottom of the box 20 and the hub 4, thus giving it a fixed attachment and permitting the hub 19 to turn about it as well as in the oil box. At its upper end the rod is bent over and connected by a bolt 133 to the outer edge of the cam track 71 in position to clear the rollers on the iron sections 31 traveling thereon. The roller 130 is tapered to avoid raising the wedge lug 129 high above the plunger. When the roller engages a wedge lug it gives the plunger a sudden depression which will cause the pins 128 to break the retaining parts of the baked batter in the holes 125 and to punch the baked cones aloose from the male molds 103. A chute 134 is provided in position to receive the baked cones as they are punched aloose from the male molds and this chute guides the cones to a suitable point for trimming. It will be understood in my arrangement that the several baked cones are connected by a thin web 135 of baked batter which covers the baking face of the irons, this being formed from a small excess of batter which is deposited to insure the formation of perfect cones in all the molds.

The presence of this batter web 135 and the formation of the holes 125 so as to form baked keys to hold the set of cones to the top iron 31 are both important features of my automatic cone detaching process. I provide a hand lever 137 for throwing the clutch for interlocking the pulley 14 and the small driving pinion 15 to start the mechanism and for disconnecting said elements to interrupt the drive of the machine.

The operation of my continuous cone baking machine may be briefly described by following a baking iron immediately after the detachment of the previously baked cones therefrom. The iron section 22 will be traveling on the moving carrier towards the batter deposit, while the elevated male section 31 is riding on the cam track 71. At the proper time the batter deposit is automatically started by the engagement of the opening cam 118 with the roller 112 on the operating rod for the bottom valve 97, and a proper amount of batter is deposited in each female mold of the baking iron as it passes under the batter valve. The iron 22 will be quite hot as it has just emerged from the oven and the cooking operation will commence by the time the cam track 71 has lowered the male mold 103 into position in the female molds 102. The baking iron sections will remain closed until the roller 73 engages and lifts the iron 31 sufficiently to permit the escape of the steam from the molds 102, after which the cam 74 will compress the mold sections tightly together and the clamp 27 will be applied by its engagement with the roller 75 so as to lock the baking irons together and immediately thereafter they pass into the baking oven and are there exposed both above and below to the flame from the burner pipes 51 and 57, the heat from these burners being equalized above and below the carrier 5 by means of the ports 23 so as to produce uniform top and bottom baking. The time required for the baking iron to pass through the oven is that necessary for the proper baking of the cones and as the iron escapes from the oven its sections are again compressed tightly together by the cam 66 and while compressed the trips 69 disengage the loosened clamps and immediately thereafter the roller 70 will engage the iron 31 and lift it so as to break the irons apart, after which the cam rail 71 will engage and raise the top iron section 31, causing the plunger 126 on the latter to pass under and be depressed by the roller 130 for the discharge of the baked cones. While this takes place the iron 22 again comes under the batter deposit and the operation is repeated. I prefer to use sufficient oil in the batter to avoid the necessity of oiling the irons but where this is necessary any suitable appliance may be utilized to that end.

When I refer to the carrier as movable relatively to the batter deposit mechanism, I contemplate that the same results will obtain where relative movement occurs between the batter deposit mechanism and the baking irons, regardless of which port moves.

This invention is not intended to be restricted in scope to the specific embodiments shown, but contemplates such modifications as come within the spirit and scope of the claims.

What I claim as new and desire to secure by Letters Patent, is:—

1. In a baking machine of the character described, a traveling carrier having sectional baking irons thereon, means to heat the irons during part of their travel, means to separate the irons during part of their travel, latch means to clamp the iron sections together, trip means to apply and release the latch means, and means to compress the iron sections together during the applying and releasing of said latch means.

2. In a baking machine of the character described, a traveling carrier, sectional baking irons mounted thereon, means to heat the irons, means to separate the iron sections, means to clamp the iron sections together while exposed to the heat, wedge means adapted to compress the iron sections as they approach and leave the baking zone of their travel, and means to engage and release the clamp means while the iron sections are under compression.

3. In a baking machine of the character described, a traveling carrier, sectional baking irons mounted thereon, means to heat the irons in their baking zone of travel, means to separate the iron sections, means to clamp the iron sections together during the baking operation, fixed wedge means interposed in the path of the traveling iron and adapted to compress the iron sections tightly together as they approach and leave the baking zone of their travel, and means to engage and release the clamp means while the iron sections are under compression.

4. In a baking machine of the character described, a traveling carrier, sectional baking irons mounted thereon comprising each a vertically movable member, a latch on the carrier for each baking iron, and an anti-friction roller mounted on the free end of each movable member adapted to be engaged by its respective latch.

5. In a baking machine of the character described, a traveling carrier, sectional baking irons mounted thereon comprising each a vertically movable hinged member, a latch on the carrier adapted to engage the free end of each hinged member, an antifriction roller mounted on each hinged member with which its respective latch engages, stationary means to trip said latch, and means to compress the iron sections together contemporaneously with said tripping operation.

6. In a baking machine of the character described, a rotatable carrier, sectional baking irons carried thereby and comprising each a vertically movable section having a roller bearing at its free end, two rollers mounted on said bearing, latches on the carrier severally disposed to engage one roller on its respective movable iron section to clamp the iron sections in closed position, a cam track adapted to engage the other roller to separate the iron sections, trip means to automatically engage and disengage said latches, and wedge means adapted to co-act with said cam engaging roller on each upper iron section to compress the iron sections together during the latching and unlatching operations.

7. In a baking machine of the character described, a circular carrier frame having female baking irons non-rotatably mounted therein and male baking irons hingedly connected thereto and movable to closed relation to the female baking irons, a baking oven cover closely fitted over the carrier frame subtending a predetermined zone of travel of the irons, a burner in said oven cover above the irons, and a burner disposed beneath the carrier and under said oven cover, there being heat equalizing ports arranged in the carrier between the irons, as and for the purposes described.

8. In a baking machine of the character described, a rotating table having fixed baking irons therein, there being ports provided in the table between the irons, a baking hood covering the irons overhead during a portion of their travel, a gas burner extending the length of said hood above the irons, a gas burner extending the length of said hood and disposed under the table, and means to rotate the table.

9. In a baking machine of the character described, a batter deposit mechanism comprising a relatively long small diameter feed tube for baking molds associated therewith, and means to open and close said tube at its discharge end.

10. In a baking machine of the character described, a batter deposit mechanism comprising a small diameter feed tube for a series of movable baking molds associated therewith, automatic valve means to open and close said tube at its discharge end, and means to regulate the extent to which the valve opens the tube.

11. In a baking machine, a batter deposit mechanism comprising a small diameter feed tube for each aligning series of movable baking molds associated therewith, and means to open and close said tube near its discharge end, the diameter of the tube being so small that the portion thereof subjected to substantial heat is washed clean with each batter discharge.

12. In a baking machine of the character described, a batter deposit apparatus comprising a feed tube extending close to the zone of travel of the baking elements, a sliding ported valve plate engaging and normally sealing the discharge end of said tube, and means automatically controlled by the baking machine to temporarily move the port in the valve into register with the tube.

13. In a baking machine of the character described, a batter deposit apparatus comprising a feed tube having a discharge nozzle extending close to the zone of travel of the baking elements, a sliding ported valve plate engaging and normally sealing the discharge end of said nozzle, means automatically controlled by the baking machine to temporarily move the port in the valve into register with the tube, said nozzle having a rubber washer surrounding its discharge end and adapted to frictionally engage said valve plate throughout the latter's travel.

14. In a baking machine of the character described, a batter deposit apparatus comprising a feed tube having a discharge nozzle extending close to the zone of travel of the baking elements adjustable towards and from the same, a sliding ported valve plate engaging and normally sealing the discharge end of said nozzle, means automatically controlled by the baking machine to temporarily move the port in the valve into register with the tube, said nozzle having a rubber washer surrounding its discharge end and adapted to frictionally engage said valve plate throughout the latter's travel.

15. In a baking machine of the character described, a traveling carrier, separable baking irons thereon, means to heat the baking irons, means to separate the baking irons, and a batter deposit apparatus disposed opposite the position of the irons when separated and comprising a plurality of separate batter feed tubes of small internal diameter, and a common slidable valve plate adapted to seal the discharge ends of said tubes and disposed close to the carrier, substantially as described.

16. In a baking machine of the character described, a traveling carrier, separable baking irons thereon, means to heat the baking irons, means to separate the baking irons, and a batter deposit apparatus disposed opposite the position of the irons when separated and comprising a plurality of separate batter feed tubes having discharge nozzles with small diameter feed passages therethrough, a common slidable valve plate adapted to seal the discharge ends of said nozzles and disposed close to the carrier, and means controlled by the carrier, and means controlled by the carrier to automatically shift said valve plate to open the discharge ends of said nozzles, substantially as described.

17. In a baking machine of the character described, a rotatable frame, means to support and drive the frame, female baking iron members carried by the frame, male baking iron members having arms hinged adjacent to the axis of the frame, latch means on the frame adapted to engage the free ends of said iron members to clamp them together, means to heat the irons, a cam means to separate the irons when unclamped, and vertical guides carried by the frame in one of which each of said hinged arms work, as and for the purposes described.

18. In a baking machine of the character described, a rotatable carrier comprising a marginal ring-like member having depending flanges about its inner and outer marginal edges, there being heat equalizing ports and seats for baking irons provided in its upper surface, spaced baking irons mounted in said seats, a second ring adjacent to and concentric with the axis of the carrier, a series of arms hinged to said latter ring, male baking irons carried by the free ends of said arms, and upwardly and rearwardly inclined guides for said arms carried by said first mentioned ring members, substantially as described.

19. In a baking machine, a rotatable ring carrier baking iron mounted therein and comprising top sections having pivoted arms projecting radially towards the ring axis, and guide plates mounted about the inner periphery of said ring carrier and having vertical slots in which said arms work.

20. In a baking machine, a rotatable ring carrier baking iron mounted therein and comprising top sections having pivoted arms projecting radially towards the ring axis, guide plate mounted about the inner periphery of said ring carrier and having vertical slots in which said arms work, said plates having bottom side flanges which abut, and a top circular oven having its inner side wall juxtaposed to said abutting side flanges which form a heat enclosing wall.

21. In a baking machine of the character described, a movable carrier, non-rotatable sectional baking irons thereon comprising upper and lower sections, the lower sections being mounted free of rigid attachment to the carrier, means pivotally connecting the inner ends of the sections of each iron, wedge means which successively engage the outer ends of the upper iron sections and compress the sections together, and means to latch said sections together, substantially as and for the purposes described.

22. In a baking machine of the character described, a movable carrier, baking irons mounted thereon and comprising upper and lower sections, the lower section being non-rotatably mounted free of rigid connection on the carrier, the sections having inward extensions which are pivotally connected and having outer extensions, means to latch said outer extensions together, and stationary wedging means adapted to engage the outer end projections to the upper iron sections successively to compress the sections of each iron together, as and for the purposes described.

23. In a baking machine of the character described, a circular movable carrier having top notches, non-rotatable iron sections seated free to tip upwardly in said notches and having inner and outer end projections, the top iron sections having similar end projections, means to pivot the inner end projections of each pair of iron sections, means to latch the outer end projections of each pair of iron sections together, and stationary wedge means to engage and press downwardly on the outer end projections to compress the sections of each iron together, as and for the purposes described.

24. In a baking machine of the character described, a circular movable carrier having top notches, iron sections seated free of rigid attachment in said notches and having inner and outer end projections, the top iron sections having similar end projections, means to pivot the inner end projections to each pair of iron sections, means to latch the other end projections to each pair of iron sections together, stationary wedge means to engage and press downwardly on the outer end projections to compress the sections of each iron together, and a floating ring to which the pivoted ends of the irons are connected.

25. In a baking machine of the character described, a rotating carrier, irons comprising hinged sections mounted thereon, and a floating ring to which the iron sections are hingedly connected, substantially as described.

26. In a baking machine of the character described, a rotating carrier, irons comprising hinged sections mounted thereon, and a floating ring to which the hinged ends of the iron sections are severally and loosely connected, substantially as described.

27. In a baking machine of the character described, a rotating carrier, irons comprising hinged sections mounted thereon, a floating ring, and links loosely mounted on said ring and pivotally connected to the hinges connecting the sections of each iron, substantially as described.

28. In a baking machine of the character described, a baking iron comprising upper and lower sections, the upper section having recesses left normally open to receive the batter and form baked locking keys therein to positively attach the baked product to the upper iron section.

29. In a baking machine of the character described, a baking iron comprising upper and lower sections, the upper sections having normally unobstructed openings therethrough to receive batter keys adapted to positively attach the baked product to the upper iron section, and ejector means movable into said holes to crush said keys and detach the baked products from the upper iron section.

30. In a baking machine of the character described, a sectional baking iron having in its upper section normally unobstructed upwardly flaring openings for the reception of batter keys, and a plate carrying plunger movable into and through said openings to crush the keys and dislodge the key attached product from said upper baking iron.

31. In a baking machine of the character described, a baking iron, a batter deposit mechanism for the iron comprising a relatively long conduit of small diameter leading to a point over the iron, a nozzle connected to the conduit, a support for the nozzle, and a slide valve closing the discharge end of the nozzle, the nozzle and part of the conduit exposed to excessive heat being washed clean with each batter discharge, substantially as described.

32. In a baking machine of the character described, a moving carrier having sectional baking irons, a batter deposit mechanism for the irons comprising a conduit, a nozzle connected to the conduit, a support in which the nozzle is adjustably mounted, a pivoted slide valve normally closing the discharge end of the nozzle, a reciprocating means for the valve co-ordinated with the movement of the carrier, and means to adjust the support for the nozzle to vary the extent of its registry with the valve port.

33. In a baking machine of the character described, a batter discharge mechanism comprising a reciprocable valve in the form of a plate having a port therethrough, guides for the plate, a batter feed nozzle, a support through which said nozzle is screwed to permit of its adjustment towards and from the valve, means to adjust the position of the nozzle supporting plate to vary the extent of registry of the nozzle with the valve port, and means to limit the travel of the valve.

34. In a baking machine of the character described, a batter deposit mechanism comprising a reciprocable ported valve plate, a batter conduit having a discharge nozzle adjustable towards and from said valve plate, and a ring washer surrounding the feed opening in the nozzle and forming the only element to contact with the valve plate, substantially as described.

35. In a baking machine of the character described, a batter deposit mechanism comprising a reciprocable ported valve plate, a batter conduit having a discharge nozzle adjustable towards and from said valve plate, and a ring washer surrounding the feed opening in the nozzle, said valve plate surrounding the valve port being quite thin, as and for the purposes described.

36. In a baking machine of the character described, a traveling carrier having sectional baking irons thereon, means to heat the irons during part of their travel, means to separate the irons during part of their travel, latch means to clamp the iron sections together, trip means to apply the latch means, and means to compress the iron sections together during the applying of said latch means.

In testimony whereof I affix my signature.

DAVID L. STULL.

Witness:
NOMIE WELSH.